Feb. 20, 1951 B. H. KOOB 2,542,086
FLUID CONTROL VALVE MECHANISM FOR A GLASSWARE
FORMING MACHINE BLOWHEAD OR THE LIKE
Filed Oct. 19, 1946 2 Sheets-Sheet 1
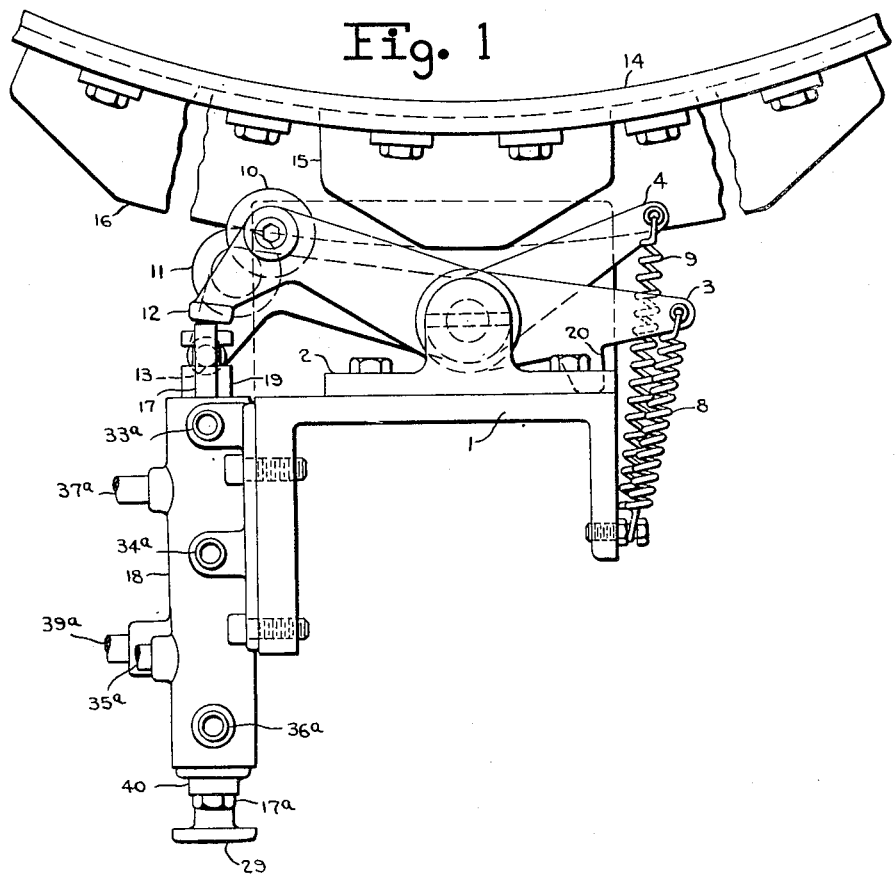
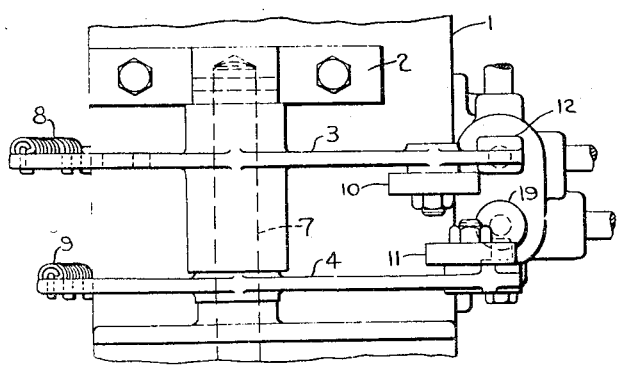
INVENTOR
BERNARD H. KOOB
BY *Parham & Bates*
ATTORNEYS Feb. 20, 1951     B. H. KOOB     2,542,086
FLUID CONTROL VALVE MECHANISM FOR A GLASSWARE
FORMING MACHINE BLOWHEAD OR THE LIKE
Filed Oct. 19, 1946     2 Sheets-Sheet 2
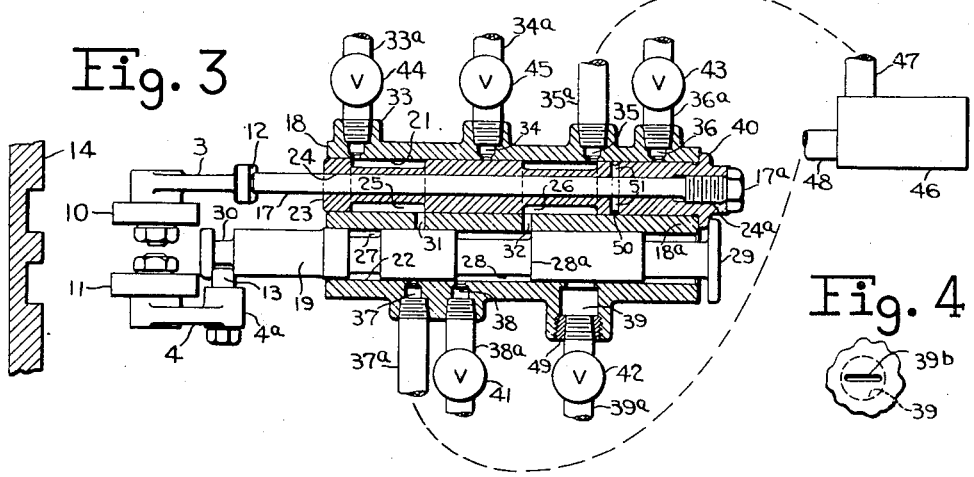
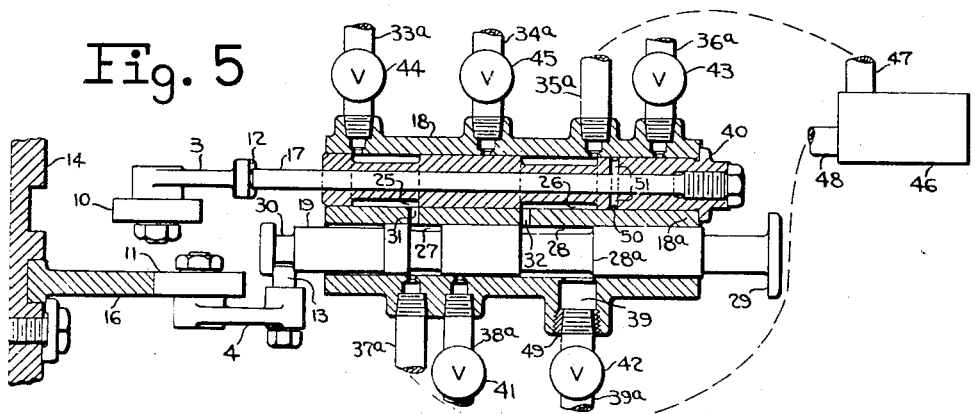
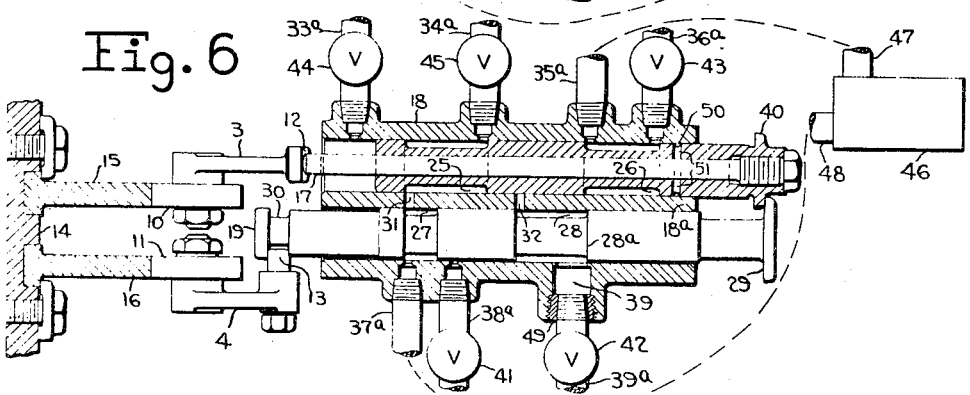
INVENTOR
BERNARD H. KOOB
BY *Parham + Bates*
ATTORNEYS Patented Feb. 20, 1951

2,542,086

UNITED STATES PATENT OFFICE 2,542,086

FLUID CONTROL VALVE MECHANISM FOR A GLASSWARE FORMING MACHINE BLOW HEAD OR THE LIKE

Bernard H. Koob, West Hartford, Conn., assignor to Hartford-Empire Company, Hartford, Conn., a corporation of Delaware Application October 19, 1946, Serial No. 704,342

4 Claims. (Cl. 277—12)

This invention relates generally to improvements in control valve mechanisms for regulating the flow of fluid to glassware forming machine blow heads or other fluid utilizing parts.

An object of the present invention is to provide a compact, simple, reliable and inexpensive valve system capable of regulating in a given timed sequence a series of fluid pressures applicable to a forming machine blow head or the like.

Another object of the present invention is to provide a means for regulating the flow of fluids to a blow head of a glass forming machine, the means utilizing relatively few fluid conveying lines connected to the blow head for the number of different pressures which may be employed and having a minimum amount of actuating mechanism associated therewith.

A more specific object of the present invention is to provide a valve mechanism having a movable valve member and a port which will gradually admit fluid under pressure on a given movement of said valve member.

A still further object of the present invention is to provide a valve mechanism which may be operatively connected to a forming machine blow head and adjusted to admit a relatively large flow of cooling air to the blow head after a lesser flow of blowing air thereto.

Additional objects and advantages of the present invention will become apparent from the following description, which has reference to the accompanying drawings, in which:

Fig. 1 is a top plan view of a valve mechanism of the present invention with associate actuating cam means, a blow head or like part to which pressure is to be supplied being omitted;

Fig. 2 is an end view of the valve mechanism of Fig. 1, showing elements of its actuating means;

Fig. 3 is a longitudinal vertical section of the valve mechanism proper with some of the ports and connections thereof displaced angularly from their true positions for inclusion in the view and with movable valve components in certain positions, the view also showing diagrammatically a forming machine blow head and fluid conducting connections of the valve mechanism therewith;

Fig. 4 is a plan view showing a novel valve port or passage in a portion of the valve housing;

Fig. 5 is a view like Fig. 3 but showing certain of the movable components of the valve and actuating means in different positions; and Fig. 6 is a view like Figs. 3 and 5 but showing still other positions of movable parts of the valve and actuating means.

The valve mechanism of the present invention may be used advantageously with the blow head of a glassware forming machine of the type disclosed in U. S. Patent No. 1,979,211, issued to George E. Rowe on October 30, 1934, although not restricted to such use or association.

Referring first to Figs. 1 and 2 of the accompanying drawings, a support generally designated 1 may be part of or attached to the framework of a forming machine (not shown). Attached to support member 1 is a bearing support bracket, generally designated 2. Two bell cranks 3 and 4 are intermediately pivotally supported for swinging movements on support 1 and bracket 2 by a vertical journal 7. Springs 8 and 9 may be attached at one end to one arm of bell cranks 3 and 4, respectively. The opposite ends of these springs may be permanently fixed to support 1. These springs tend to produce a swinging movement of the bell cranks in a clockwise direction about their vertical axis, referring to the position in which the bell cranks are shown in Fig. 1. Pivotally attached to the opposite arms of bell cranks 3 and 4, respectively, are cam rollers 10 and 11, respectively. The roller bearing arm of bell crank 3 is formed into a flat tappet surface 12. The roller bearing arm of bell crank 4 is formed into a hub 4a in which is disposed a pin 13 (Fig. 3).

Shown in Fig. 1 is a portion of a cam drum 14 on which is releasably secured an arcuate cam lobe 15 of a relatively small angular extent. Also releasably secured to drum 14 is an arcuate cam lobe 16 of relatively great angular extent. As support 1 and its associated parts are rotated about the center line of drum 14, cam rollers 10 and 11 are brought into working association with cam lobes 15 and 16, respectively, thereby imparting to bell cranks 3 and 4, respectively, counterclockwise swinging movements about journal 7.

The counterclockwise swinging movement of bell crank 3 will bring tappet face 12 into working relationship with a valve rod 17 and will move the rod axially in valve housing 18 which is secured to support member 1. The counterclockwise swinging movement of bell crank 4 will move a spool valve 19 in valve housing 18. The details of the engagement between pin 13 and spool valve 19 will be described more fully hereinafter. A stop lug 20 is formed on bell crank 3 to butt against support member 1 and thereby limit the amount of clockwise rotation of bell crank 3 about journal 7.

Thus, as herein described, a roller and cam mechanism may be employed by which suitable movements inwardly and outwardly from a valve housing may be imparted to certain valve members in conformity with the motion relative to a cam drum 14 and the arcuate extent of cam lobes attached thereto.

Valve construction

As can be seen in Figs. 3, 5 and 6, housing 18 has two cylindrical bores 21 and 22 whose axes are parallel and extend longitudinally of the valve housing. Slidably retained within bore 21 is a spool valve 23. Valve 23 has an axial hole 24 concentric with its outer cylindrical surface and extending completely therethrough. One end 24a of hole 24 may be provided with threads, and engaged therewith may be a threaded end 17a of valve rod 17. Spool valve 23 will thus be constrained to move axially in response to movements of valve rod 17. Valve 23 is provided with two annular recesses 25 and 26 of substantial axial length.

Disposed in bore 22 is spool valve 19. The valve 19 has two annular recesses 27 and 28 of substantial axial length. A button or flange 29 may be provided on one end of spool valve 19 for a purpose to be stated presently. A groove 30 is provided in the opposite end of valve 19 and is of suitable size to accommodate one end of pin 13. As pin 13 moves with hub 4a of bell crank 4 in response to swinging movements of the bell crank, valve 19 will be moved axially inwardly and outwardly in the valve housing as a result of the engagement of pin 13 in groove 30.

Two passages 31 and 32 are provided through a longitudinal partition 18a in the valve housing 18 and communicate mutually with bores 21 and 22. A plurality of passages 33, 34, 35 and 36 is provided in a side portion of housing 18 and communicates with bore 21. A plurality of passages 37, 38 and 39 is provided in another side portion of housing 18 and communicates with bore 22. As spool valve 23 is moved axially, passages 31 and 32 will be connected with certain of the passages 33 to 36, inclusive. As spool valve 19 is moved axially passages 31 and 32 will be connected with certain of the passages 37 to 39, inclusive.

As has been described, axial movements of spool valve 19 to the left and right result from the related movements of bell crank 4. Spool valve 23 may be moved towards the right, from the position shown in Figs. 3 and 5 to that shown in Fig. 6, under the action of tappet face 12 but must be returned to its original position by the engagement of button 29 with a flange 40 provided at one end of spool valve 23.

Control and regulation of flow through the valve

Flow passage 38 has an associated pipe line 38a and a hand valve 41 located therein, the line being connected with a source of low pressure expansion air. Flow passage 39 has an associated pipe line 39a and a hand valve 42 located therein, the line being connected with a source of low pressure air which may be, if desired, the same source of low pressure air feeding line 38a. Flow passage 36 has an associated pipe line 36a and a valve 43 located therein, pipe line 36a being connected with a source of high pressure air. Flow passage 33 has an associated pipe line 33a and a hand valve 44 located therein, pipe 33a being a low pressure exhaust line venting to the atmosphere. Flow passage 34 has an associated pipe line 34a and a hand valve 45 located therein, the pipe line being a high pressure exhaust line venting to the atmosphere.

Diagrammatically represented in Figs. 3, 5 and 6 is a blow head, generally designated 46. Flow passage 35 in the valve housing has an associated pipe line 35a which leads, as shown by dotted lines Figs. 3, 5 and 6, to pressure connection 47 of blow head 46. Flow passage 37 has an associated pipe line 37a leading to exhaust connection 48 of blow head 46, as indicated by dotted lines in the last mentioned figures.

Fig. 4 shows the details of construction of passage or port 39. It is to be noted that the inlet port, designated 39b between this flow passage and the bore 22 is elongated and relatively narrow, the long dimension of the passage being disposed in the valve housing parallel to the axes of the spool valves. As spool valve 19 is moved to its right-hand position, shown in Figs. 5 and 6, edge 28a of the spool valve will gradually uncover port 39b, thereby permitting a gradual flow of air to the related passages of the valve system. This particular shape of valve port makes possible a slow rate of increase of effective flow area of the port relative to given movements of spool valve 19. A bushing 49 may be provided adjacent to flow passage 39 to make it possible to elongate the port 39b to an extent greater than would be permitted by the size of the opening otherwise suitable to accommodate pipe line 39a.

In Fig. 3, both spool valves are in their left-hand positions in the valve housing, i. e., at the limits of their strokes toward their actuating cams. It is to be noted that cam rollers 10 and 11 are not in engagement with any cam lobes. When the spool valves are in this position, air will flow through pipe line 38a to passage 38 and thence to recess 28 of spool valve 19. From recess 28, the air will flow through passage 32, which is uncovered by spool valves 19 and 23, and thence around recess 26 to uncovered flow passage 35. The expansion air may then flow through supply pipe line 35a to connection 47 of the blow head.

The disposition of recesses in spool valve 19 is such that when it is in its left-hand position as shown in Fig. 3, flow passage 37 will be covered and will serve as a dead end for the return air line 37a from the blow head. Hand valve 41 may be opened slightly, and the flow of expansion air to blow head 46 may thereby be regulated to a very small quantity. By these provisions, the blow head may be employed to maintain a low pressure substantially constant in an expanding glass body (not shown) during part of the operation of expanding such a body to final form. The rate of flow of air entering the expanding body may be regulated to just equal its volume increase as it stretches and extends downwardly under its own weight.

As shown in Fig. 5, the spool valve 19 has been moved to its right-hand position by reason of the operation of its bell crank 4 by the cam lobe 16. This movement of spool valve 19 will close flow passage 38 and will gradually open to its fullest extent inlet port 39b through which low pressure air may be admitted to recess 28 of spool valve 19. It will be noted further that flow passage 32 will still be in communication with recess 28 and recess 26, the low pressure blowing air thereby being permitted to flow through passage 32 to recess 26 and thereafter by pipe line 35a to connection 47 of blow head 46. The movement of valve 19 to the right also will uncover flow passage 37, thereby permitting a return flow of air from fitting 48 of blow head 46 to recess 27 of valve 19. This return air may then flow through passage 31 to annular recess 25 and thereafter to flow passage 33 and thence to vent line 33a. With a suitable adjustment of valves 42 and 44, a regulated flow of air may be admitted to the blow head and thence to the article, the flow and pressure of the air being suitable to blow the article to its fullest extent within the blow mold. Thereafter, the air returns from the blow mold through pipe line 37a to be vented eventually to the atmosphere. It is noteworthy, therefore, that with the valve condition shown in Fig. 5, the article is not only blown to the shape of the blow mold but may also be partially cooled by the return flow of air from the blow mold.

In Fig. 6, the parts of the valve are suitably positioned for supply of relatively large quantities of cooling air to the blown article in the associate of blow mold after the blowing operation has been completed. It will be noted that cam 15 is in bearing relationship with cam roller 10 and that bell crank 3 has been swung about journal 7 and has moved valve rod 17 to the right.

Valve rod 17 may be adjusted axially so as to avoid any binding action between rod 17 and face 12 of bell crank 3 or between button 29 and flange 40 during this movement.

With the above described valve condition, high pressure air may be admitted through pipe line 36a to hand valve 43, thence to flow passage 35 and thereafter to recess 26. The air may flow axially along recess 26 to flow passage 35 from which air will flow to supply pipe line 35a and thereafter to blow head 46 by means of connection 47. Return or exhaust air may flow from return pipe line 37a through flow passage 37 to annular recess 27, thereafter to passage 31, then to recess 25 and finally through flow passage 34 and exhaust valve 45 to the exhaust line or vent 34a. By a suitable regulation of hand valves 43 and 45 a relatively large quantity of cooling air may be circulated to the blow head, into the formed article, and back to the valve housing and thence to the atmosphere. This circulation of cooling air will accelerate cooling of the formed article.

When cam roller 11 rides off the end of the cam lobe 16, spring 9 will rotate bell crank 4 to return it to its initial starting position. By this time, bell crank 3 will already have returned to its initial position with lug 20 butting against support 1. Bell crank 4 will move spool valve 19 to the left from the position shown in Figs. 5 and 6. Spool valve 23 also will be returned from its right-hand position, Fig. 6, by the contact of button 29 against flange 40 which in turn will butt against the valve housing.

The provision of hand valves 41 to 45, inclusive, lends great flexibility to this valve system and permits regulation not only of the pressure conditions within the article being formed but also of the amount of air flow to the article during various periods of its formation. Although a high pressure air source may be used to feed pipe line 36a, valves 43 and 45 may be adjusted to maintain the same pressure condition within the article during the cooling period as was used during the forming period, but the flow of air during the cooling period may be considerably in excess of the flow of air during the blowing period. If for any reason the use of expansion air is not desirable, valve 41 may be closed off entirely, thereby preventing entrance of expansion air to the system.

A groove 50 may be provided in a right-hand portion of spool valve 23. Two or more small flow passages 51 may be provided transversely in valve 23, joining groove 50 with hole 24. Hole 24 is of a sufficient size to provide a slight amount of clearance between its wall surface and the surface of valve rod 17. Any leakage from high pressure line 36a will thus vent to the atmosphere through groove 50, holes 51, and the clearance space along rod 17. In this way, any leakage of high pressure air is prevented from entering line 35a when the valve position is that shown in Figs. 3 or 5.

It is noteworthy that by the use of the present invention a plurality of fluids under various pressure conditions and flowing at various rates may be fed to a blow head to which is attached only a supply line and a return line. Thus, the present valve system by suitable movements of its members feeds the various fluids in timed sequence to the supply line of blow head and in timed sequence connects the return line of the blow head to each of a plurality of vent lines. It is also noteworthy that a relatively simple system utilizing only two cam lobes and two bell cranks is suitable for regulating the movements of the valve members.

Having thus described my invention, I claim:

1. In a valve mechanism for feeding a plurality of pressure and flow regulated fluids in timed sequence to a glass forming machine blow head, a valve housing having a pair of spaced parallel bores therein, a wall structure of said housing separating said bores and having a pair of flow passages mutually communicating with said bores at places spaced along their length, high pressure fluid inlet and exhaust lines, a low pressure fluid exhaust line and a pressure fluid outlet line communicating with one of said bores at places spaced along the bore, an expansion fluid inlet line, low pressure fluid inlet line and a pressure fluid return line communicating with the other bore at longitudinally spaced places therealong, a pair of spool valves reciprocably disposed in said bores, said valves having a plurality of annular grooves located at places spaced longitudinally of said valves in relation to each other and to said flow passages in said wall structure, and means to move said spool valves longitudinally of their bores to predetermined positions to interconnect by means of said grooves and flow passages said expansion, low pressure, and high pressure fluid inlet lines and exhaust lines with said pressure fluid outlet and return lines in a predetermined timed sequence.

2. In a fluid control valve mechanism, a valve housing formed to provide a pair of adjacent parallel bores extending therethrough and a common partion wall between the bores, said partition wall having two longitudinally spaced passages formed therethrough to establish communication between said bores, said housing being provided in a portion thereof constituting an outer wall of one of said bores with a low pressure fluid exhaust passage, a high pressure fluid exhaust passage, a fluid pressure outlet passage and a high pressure fluid intake passage, respectively, spaced longitudinally of the housing, said housing also being provided in a portion thereof constituting an outer wall of the second bore with a pressure fluid return passage; an expansion fluid intake passage and a low pressure fluid intake passage, respectively, spaced longitudinally of the housing, a longitudinally reciprocable spool valve in said first bore and annularly formed with successive lands and annularly grooved portions on its periphery such that when said spool valve is in one position in its bore it will establish communication between one of said passages in said partition and said low pressure fluid exhaust passage and between the second passage in the partition and said fluid pressure outlet passage and will block off said high pressure fluid exhaust passage and said high pressure fluid intake passage and when in a different position in its bore will establish communication between the first passage in the partition and said high pressure fluid exhaust passage and between said high pressure fluid intake passage and said fluid pressure outlet passage and will block off said second passage in the partition, a second longitudinally reciprocable spool valve in the second bore formed with successive lands and annularly grooved portions on its periphery such that when it is in one position in its bore it will block off said first passage in the partition and also said pressure fluid return passage and said low pressure fluid intake passage and will establish communication between said expansion fluid intake passage and the second passage in said partition and when in another position in its bore will establish communication between said fluid pressure return passage and said first passage in the partition and between said low pressure fluid intake passage and said second passage in the partition and will block off said expansion fluid intake passage, and means to move said spool valves in their bores to position said spool valves simultaneously in their said first named positions, then to move said second spool valve to its second named position, then said first spool valve to its second named position and finally both spool valves from their second named positions simultaneously back to their first named positions.

3. In a fluid control valve mechanism, the combination as defined by claim 2 wherein said low pressure fluid intake passage is formed as a metering passage and is uncovered progressively by movement of said second named spool valve in its bore from its said first position to its said second position.

4. In a fluid control valve mechanism, the combination as defined by claim 2 wherein said spool valves have end portions projecting from one end of said housing when the spool valves are in their second named positions and the extending end of the second spool valve has a button thereon located outwardly beyond and overlapping a flange on the extending end of the first spool valve so as to be engageable therewith to return the first spool valve to its first position when the second spool valve is returned to its first position while permitting separate movements of the spool valves from their first positions to their second positions.

BERNARD H. KOOB.

REFERENCES CITED

The following references are of record in the file of this patent:

UNITED STATES PATENTS

| Number | Name | Date |
|---|---|---|
| 1,914,457 | Parsons | June 20, 1933 |
| 2,209,418 | Overbeke | July 30, 1940 |
| 2,238,768 | Berglund | Apr. 15, 1941 |
| 2,382,028 | Samuelson | Aug. 14, 1945 |
| 2,396,643 | Deganahl | Mar. 19, 1946 |